United States Patent
Imamura et al.

(10) Patent No.: US 12,234,331 B2
(45) Date of Patent: Feb. 25, 2025

(54) METHOD FOR PRODUCING EPOXY RESIN COMPOSITION

(71) Applicant: CANON KABUSHIKI KAISHA, Tokyo (JP)

(72) Inventors: Isao Imamura, Kanagawa (JP); Sachiko Yamauchi, Kanagawa (JP); Hiroki Kihara, Kanagawa (JP); Haruka Yamaji, Tokyo (JP); Yasushi Iijima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 394 days.

(21) Appl. No.: 17/143,349

(22) Filed: Jan. 7, 2021

(65) Prior Publication Data
US 2021/0221964 A1 Jul. 22, 2021

(30) Foreign Application Priority Data

Jan. 17, 2020 (JP) .................................. 2020-005947
Oct. 30, 2020 (JP) .................................. 2020-182573

(51) Int. Cl.
*C08J 3/20* (2006.01)
*C08K 13/02* (2006.01)

(52) U.S. Cl.
CPC .............. *C08J 3/203* (2013.01); *C08K 13/02* (2013.01); *C08J 2363/00* (2013.01)

(58) Field of Classification Search
CPC ....... C08J 3/203; C08K 13/02; C08K 2363/00
See application file for complete search history.

(56) References Cited

U.S. PATENT DOCUMENTS

| 5,430,112 | A | * | 7/1995 | Sakata | .................. | C08G 59/66 |
|---|---|---|---|---|---|---|
| | | | | | | 528/109 |
| 6,913,798 | B2 | | 7/2005 | Kitamura et al. | | |
| 7,541,075 | B2 | | 6/2009 | Kitamura et al. | | |
| 8,304,469 | B2 | | 11/2012 | Kimura et al. | | |
| 9,757,944 | B2 | | 9/2017 | Takagi et al. | | |
| 11,472,957 | B2 | | 10/2022 | Iwaya et al. | | |
| 2013/0090431 | A1 | * | 4/2013 | Ming | ...................... | C08L 61/06 |
| | | | | | | 525/486 |
| 2013/0128435 | A1 | * | 5/2013 | Mizuta | .................. | C08G 59/42 |
| | | | | | | 361/679.01 |

FOREIGN PATENT DOCUMENTS

| CN | 106753121 A | * | 5/2017 | ............. | C09J 11/04 |
|---|---|---|---|---|---|
| EP | 1 291 390 A1 | | 3/2003 | | |
| JP | 6-211969 A | | 8/1994 | | |

(Continued)

OTHER PUBLICATIONS

English machine translation of CN 106753121A. (Year: 2017).*
U.S. Appl. No. 17/144,390 filed Jan. 8, 2021, Yamaji et al.

*Primary Examiner* — John E Uselding
(74) *Attorney, Agent, or Firm* — Venable LLP

(57) ABSTRACT

There is provided an epoxy resin composition containing an epoxy resin, a solid basic compound, and a polythiol. By preparing a mixture 1 by kneading the epoxy resin with the solid basic compound, and then kneading the polythiol therewith, the dissolution of the solid basic compound into the polythiol is rate-limited to ensure the pot life, and due to a catalyst action by the dissolution of the solid basic compound at a time of heating, heat curability in a short time is realized.

17 Claims, 3 Drawing Sheets

(56) References Cited

FOREIGN PATENT DOCUMENTS

| | | | |
|---|---|---|---|
| JP | 2000-230112 | A | 8/2000 |
| JP | 2009-51954 | A | 3/2009 |
| JP | 2009-292881 | A | 12/2009 |
| JP | 2015-221541 | A | 12/2015 |
| JP | 2017-95571 | A | 6/2017 |
| JP | 6620273 | B1 | 12/2019 |
| WO | 01/98411 | A1 | 12/2001 |
| WO | 2016/171072 | A | 10/2016 |
| WO | 2018/079466 | A1 | 5/2018 |

* cited by examiner

METHOD FOR PRODUCING EPOXY RESIN COMPOSITION

BACKGROUND OF THE INVENTION

Field of the Invention

The present disclosure relates to a method for producing an epoxy resin composition.

Description of the Related Art

An epoxy-based adhesive is widely used since the adhesive has high adhesiveness and high chemical resistance. In particular, joining of precision parts is required to have curability (also referred to as temporary fixing property) in a short time so as not to cause displacement.

A representative example of the epoxy-based adhesive having such characteristics include a photocationic polymerization type epoxy resin adhesive. This adhesive has a long pot life as one pack and is cured by heating for several seconds, and thus is industrially preferably used. For example, since changes in physical properties such as viscosity at room temperature are small, the adhesive can be stably applied to an adherend. In addition, after application, UV irradiation is performed to laminate the adherend and cure the adherend by heating at 100° C. for several seconds, and thus displacement is hardly likely to occur and holding the adherend for a long time is also not required. Therefore, the step can be proceeded quickly to a subsequent step. By performing additional heating as necessary, the crosslinking density is further increased, and the mechanical properties and chemical resistance are also improved. In this way, productivity and reliability are improved by performing two-stage curing.

Since an ether bond is formed by opening of an epoxy ring, the photocationic polymerization type epoxy resin is excellent in chemical resistance. However, as the ether bond is formed, the number of functional groups that contribute to adhesion such as hydroxyl group decreases, and the adhesiveness may not be sufficient.

Among the polymerization reactions of an epoxy resin, examples having a high reaction rate include thiol curing using a polythiol as a curing agent. It is an anion polymerization in which a polythiol reacts with the epoxy resin at a high speed in the presence of a basic catalyst or curing accelerator. As an adhesive using this thiol curing, the adhesive disclosed in International Publication No. WO2016/171072A1 is known.

SUMMARY OF THE INVENTION

The present disclosure relates to a method for producing an epoxy resin composition containing an epoxy resin, a solid basic compound, and a polythiol, the method including a step of producing a mixture 1 by kneading the epoxy resin with the solid basic compound, and a step of producing a mixture 2 by kneading the polythiol with the mixture 1.

In addition, the present disclosure relates to a method for producing an epoxy resin composition containing an epoxy resin, a thixotropic agent, a solid basic compound, and a polythiol, the method including a step of producing a mixture 3 by kneading the epoxy resin with the thixotropic agent, a step of producing a mixture 4 by kneading the solid basic compound with the mixture 3, and a step of producing a mixture 5 by kneading the polythiol with the mixture 4.

In addition, the present disclosure relates to a method for producing an epoxy resin composition containing an epoxy resin, a thixotropic agent, a solid basic compound, and a polythiol, the method including a step of producing a mixture 1 by kneading the epoxy resin with the solid basic compound, a step of producing a mixture 6 by kneading the polythiol with the thixotropic agent, and a step of producing a mixture 7 by kneading the mixture 1 with the mixture 6.

Further features of the present disclosure will become apparent from the following description of exemplary embodiments with reference to the attached drawings.

DESCRIPTION OF THE EMBODIMENTS

Figure 1:
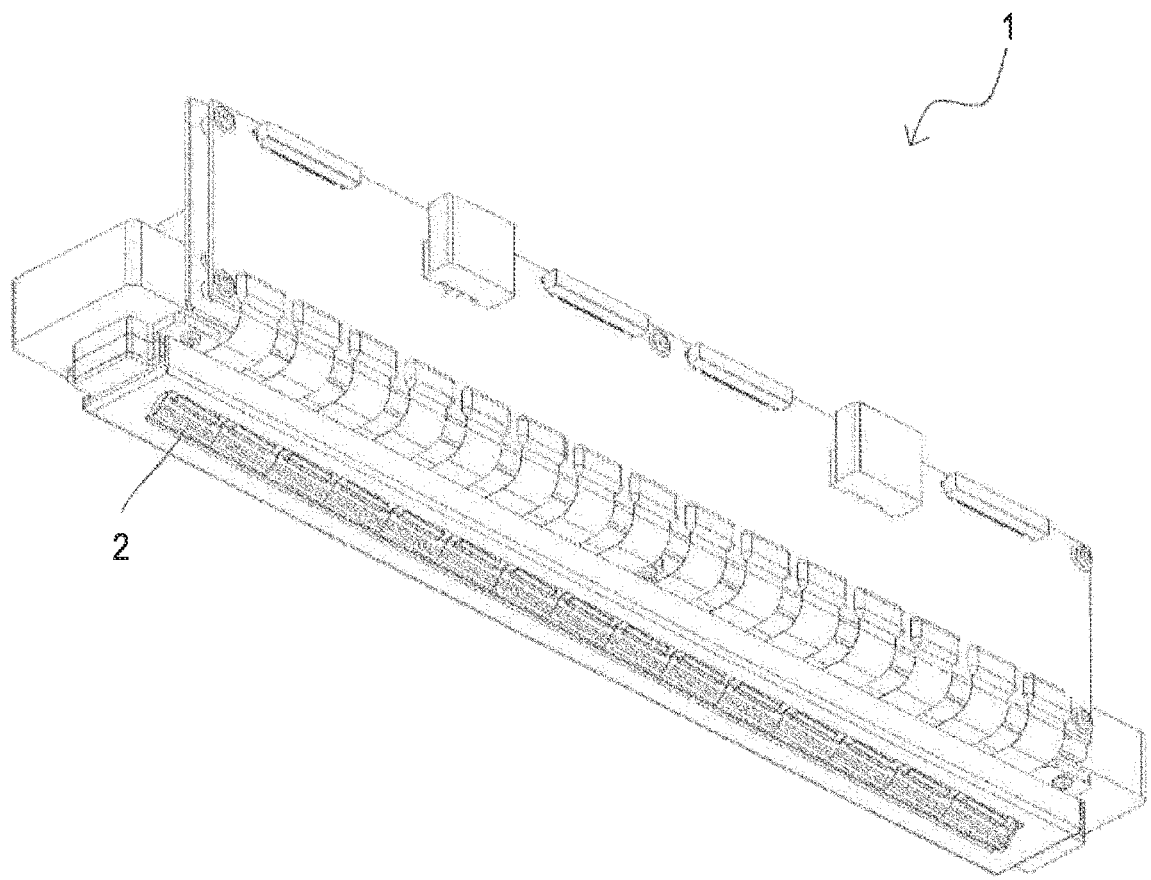
FIG. 1 is a perspective view of an inkjet head.

Thiol curing has significantly high reactivity, but has a short pot life, for example, curing being done in a syringe while being applied to a plurality of adherends, and therefore some studies are required in terms of practical use. In such thiol curing, there is a method of selecting a solid basic catalyst or a curing accelerator as means for extending the pot life. For example, if a solid basic compound is used for thiol curing, the time required until the solid basic compound is dissolved to become a basic catalyst is shortened. However, along with the epoxy resin as a main agent, a polythiol of the curing agent is also usually a liquid. In particular, a solid basic compound is easily dissolved in the polythiol having a relatively low viscosity, and even if the reaction initiation can be slightly delayed, the pot life may still be insufficient. In addition, even if the pot life is successfully extended by reducing the amount of the basic compound, for example, the curability of short-time heating may be inferior and the temporary fixing property may not be sufficient. In order to solve the problem of pot life, in a case where the adhesive is two-pack type instead of one-pack type, it is necessary to perform kneading each time, to fill a syringe with the adhesive, and to set the adhesive in an apparatus, which is significantly low in productivity. In addition, since the reaction proceeds after kneading, the pot life is short and the productivity is further inferior.

An object of the present disclosure is to provide an epoxy resin composition which has a sufficient pot life as one pack and has curability by heating for a short time. In addition, the present disclosure also provides a liquid ejection head using the epoxy resin composition and a method for producing the liquid ejection head.

The present disclosure provides an epoxy resin composition (adhesive) containing an epoxy resin, a solid basic compound, and a polythiol.

However, the solid basic compound is easily dissolved in the polythiol having a relatively low viscosity, and at the time of dissolution, the solid basic compound is coordinated with the polythiol, and the epoxy resin and the polythiol react very quickly. Therefore, it was thought that even if such a solid basic compound was used as a catalyst, the pot life could not be sufficiently obtained.

However, according to the examination by the present inventors, it has been found that the dissolution of the solid basic compound in a relatively low-viscosity polythiol can be suppressed by covering a surface of the solid basic compound with the epoxy resin. The solid basic compound covered with the epoxy resin is dissolved in the polythiol to become a basic catalyst, and it takes time to start the reaction between the epoxy resin and the polythiol. Therefore, the viscosity as one pack rises slowly even at room temperature, and a sufficient pot life can be obtained. In addition, by covering the surface of the solid basic compound with an epoxy resin, the pot life can be sufficiently secured, and thus the solid basic compound can be blended in an amount that has never been possible before, and the reaction start point increases. Therefore, curing by heating for a short time is possible. In this way, even though it is the one pack type, both a sufficient pot life and curing in a short time can be achieved. In particular, in a system to which a thixotropic agent is added, application and adhesion without spreading due to the expression of thixotropy are possible, and thus the composition is excellent in applicability to fine sites. In addition, the viscosity of the epoxy resin and/or the polythiol can be increased with a thixotropic agent to further suppress the dissolution of the solid basic compound in the polythiol, and the pot life becomes longer.

Since the adhesive obtained by the method of the present disclosure is a basic thiol-curing adhesive, the functional groups that contribute to the adhesion of hydroxyl groups and the like due to the curing reaction are unlikely to decrease, and the adhesive has excellent adhesiveness.

Therefore, the method for producing an adhesive according to an embodiment of the present disclosure is characterized to include a step of preparing a mixture 1 by kneading an epoxy resin with a solid basic compound, and kneading a polythiol with the mixture 1. By going through this step, the solid basic compound is covered with the epoxy resin, and thus it is possible to suppress the dissolution contact of the solid basic compound by the polythiol, the viscosity increases slowly as one pack even at room temperature, and a sufficient pot life is obtained for the adhesive of the present disclosure.

In addition, in another embodiment of the method for producing an adhesive of the present disclosure, by going through a step of kneading the thixotropic agent with the epoxy resin and/or the polythiol in advance, dissolution contact of the solid basic compound with the polythiol can be further suppressed. As a result, the pot life as one pack can be further secured. With this thixotropic agent, a larger amount of the solid basic compound can be blended, and the thiol curability of the originally highly reactive epoxy can be further improved. Although it is a one pack type, the adhesive can be cured at a temperature of about 100° C. in several seconds, and excellent temporary fixing property can be exhibited. On the other hand, an adhesive having a sufficient pot life can be obtained.

The adhesive of the present disclosure is thiol-curing (anionic polymerization reaction) adhesive, functional groups that contribute to adhesion such as hydroxyl groups remain even after curing, and thiol-derived —S— has flexibility. Therefore, a strong adhesive force to the adherend can be expected even in a harsh environment. For example, the adhesive can be applied to an adhesive for bonding parts of a liquid ejection head represented by an inkjet head. An ink used for the inkjet head includes a polar solvent, water, and a coloring material, and the adhesive that bonds the sites that come into contact with the ink is required to maintain a strong adhesive force. In addition, it is desired to maintain a strong adhesive force at the interface between the adherend and the adhesive so that different colors do not mix between the separated liquid flow paths. The reason is that if a gap is created at the interface between the adherend and the adhesive, the ink penetrates through the gap from the liquid flow path of each color due to capillary force, and there is a high possibility that different colors are mixed.

In addition, in the production step of the inkjet head, a step of fixing small parts with an adhesive to the extent that the small parts do not move and sending the parts to a subsequent bonding step of the parts is repeated, and finally the adhesive is cured over a relatively long time. The step of fixing the parts with an adhesive to the extent that the parts do not move is referred to as temporary fixing, and the step of curing the adhesive over a relatively long time is referred to as main curing. For example, the temporary fixing is performed at 100° C. in several seconds, and finally the main curing is performed at 150° C. for 2 hours. Since the adhesive of the present disclosure is cured at a temperature of about 100° C. in several seconds, the adhesive is suitable for a temporary fixing step of an inkjet head.

Each constituent component will be described.

(Epoxy Resin)

The epoxy resin as a main agent may be one kind or may contain two or more kinds.

Since it is necessary to cover the solid basic compound as a catalyst, the epoxy resin composition needs to be liquid in the step of kneading the solid basic compound. In a case where an epoxy resin that is solid at room temperature is used, the solid basic compound may be heated to a temperature at which the compound does not melt to make the compound liquid, or the solid basic compound may be dissolved in another liquid epoxy resin.

Examples of the epoxy resin include epoxy resins such as bisphenol A type epoxy resin, bisphenol F type epoxy resin, and bisphenol AD type epoxy resin, glycidyl ether type or glycidyl amine type epoxy resins such as glycidyl ether of compound in which alkylene oxide is further added, epoxy novolac resin, bisphenol A novolac diglycidyl ether, and bisphenol F novolac diglycidyl ether, alicyclic epoxy resin, and the like. Examples of the solid epoxy resin at room temperature include an epoxy resin having a biphenyl skeleton, a naphthalene skeleton, a cresol novolac skeleton, a trisphenolmethane skeleton, a dicyclopentadiene skeleton, a phenol biphenylene skeleton, and the like.

(Polythiol)

The polythiol as a curing agent is not particularly limited, but usually, a polythiol having high reactivity and a relatively low molecular weight is selected. Such a polythiol is often liquid at room temperature.

For example, pentaerythritol trispropanethiol (PEPT), trimethylolpropane tris(3-mercaptopropionate) (TMMP), pentaerythritol tetrakis(3-mercaptopropionate), P-xylenedithiol and the like are exemplified.

Examples of commercially available products include PEPT (manufactured by SC Organic Chemical Co., Ltd.), TMMP (manufactured by SC Organic Chemical Co., Ltd.), Cup Cure 3-800 (product name, manufactured by Mitsubishi Chemical Corporation), QX11 (product name, manufactured by Mitsubishi Chemical Corporation), and the like.

In a case where the adhesive of the present disclosure is used in a site requiring more chemical resistance, a polythiol having an ether skeleton with more chemical resistance is preferable. The polythiol having an ether skeleton has two or more thiol groups in the side chain, does not contain a hydrolyzable ester bond in the main chain, and has high bonding force. Therefore, the polythiol having an ether skeleton refers to a compound having an ether bond having excellent properties such as chemical resistance.

The content of the polythiol is preferably such that the polythiol is 0.5 to 1 thiol equivalents with respect to 1 epoxy equivalent of the epoxy resin. If the amount of the polythiol is smaller than that of the epoxy resin, the reaction ratio between the epoxy resin and the polythiol decreases, and thus the reaction of the entire system becomes slow and curing in a short time may not be expected. In addition, if the equivalent of polythiol is small, the polymerization reaction between the epoxy resin and the polythiol may not be the main reaction, but the polymerization reaction between the epoxy resin and a base derived from the solid basic compound may be the main reaction. Therefore, the flexibility of the polythiol-derived thioether structure (—S—) is reduced, which is not preferable from a viewpoint of adhesiveness. If the polythiol equivalent is too large with respect to the epoxy resin, the amount of polythiol that cannot react with the epoxy resin increases. Since the unreacted polythiol remains as a plasticizer, mechanical properties may become inferior. For example, adhesive force is lowered. In addition, in a case where an adhesive is used on a site that comes into contact with the ink, the unreacted polythiol is eluted into the ink, and the ink may penetrate into a space of the eluted polythiol instead, and the adhesive may swell with the ink, which is not preferable.

(Solid Basic Compound)

The solid basic compound as the curing catalyst is not particularly limited as long as the compound is solid at room temperature, but a compound that is difficult to be dissolved in the epoxy resin is preferably used.

Examples thereof include dicyandiamide, a dihydrazide compound, solid aromatic amines such as diaminodiphenylmethane (DDM) and diaminodiphenylsulphon (DDS), various imidazoles, and various amine adduct-based latent curing agents, which are generally used as latent curing agents.

The content of the solid basic compound is preferably 3 to 10 parts by mass with respect to 100 parts by mass of the epoxy resin. If the amount of the solid basic compound is too small with respect to the epoxy resin, curing in a short time cannot be expected. If the amount of the solid basic compound is too large with respect to the epoxy resin, the amount of the solid basic compound that is protected by the epoxy resin of the solid basic compound but is dissolved in the polythiol increases, and the pot life becomes short. In particular, according to the production method of the present disclosure, the solid basic compound can be added in a large amount such as 3 to 10 parts by mass with respect to 100 parts by mass of the epoxy resin while sufficiently maintaining the pot life.

(Thixotropic Agent)

For the purpose of lowering the fluidity of the liquid component and further suppressing the dissolution of the solid basic compound in the polythiol, a thixotropic agent may be added to the epoxy resin composition (adhesive), as a component other than the epoxy resin, the solid basic compound, and the polythiol.

As the thixotropic agent, an inorganic fine substance represented by general fumed silica or the like can be used. In addition, there is a liquid type that can impart thixotropy without increasing the viscosity so much, but in this case, other fillers such as glass, titanium oxide, alumina, aluminum hydroxide, magnesium hydroxide, talc, mica, and silica are required. As the liquid type, polyamide-based, ester-based, hydrogenated castor oil-based, polyethylene oxide-based, surfactant-based, and the like can be used. These may be used alone, or may be used in combination of two or more kinds.

The content of the thixotropic agent is preferably 1 to 20 parts by mass with respect to 100 parts by mass of the epoxy resin. The more the thixotropic agent, the longer the pot life tends to be. Therefore, along with the desired pot life, the amount of the thixotropic agent may be adjusted. The method of mixing the thixotropic agent will be described later.

(Method for Producing Epoxy Resin Composition)

In the method for producing an epoxy resin composition (adhesive) according to the present disclosure, each raw material of the adhesive is mixed in the following order for the purpose of suppressing the dissolution of the solid basic compound in the polythiol.

(Adhesive not Containing Thixotropic Agent)

The method for producing an adhesive according to the present embodiment includes a step of producing a mixture 1 by kneading an epoxy resin with a solid basic compound, and a step of producing a mixture 2 by kneading a polythiol with the mixture 1. Compared to a case where the epoxy resin, the solid basic compound, and the polythiol are kneaded together without taking the above order, the viscosity of the adhesive kneaded in the above order increases even when stored at room temperature, and the adhesive had a sufficient pot life. Since the adhesive kneaded in the above order has a sufficient pot life, it is possible to add the solid basic compound in an amount that cannot be considered with the adhesive kneaded at one time, and curing in a short time can be expected.

(Adhesive Containing Thixotropic Agent)

In addition, in the production of the adhesive containing the thixotropic agent, the process can be carried out in the following step order. First, a step of producing a mixture 3 by kneading an epoxy resin with a thixotropic agent, a step of producing a mixture 4 by kneading a solid basic compound with the mixture 3, and a step of producing a mixture 5 by kneading a polythiol with the mixture 4.

The adhesives kneaded in this order had a longer pot life.

In addition, another method may be a production method including a step of producing a mixture 1 by kneading an epoxy resin with a solid basic compound, a step of producing a mixture 6 by kneading a polythiol with a thixotropic agent, and a step of producing a mixture 7 by kneading the mixture 1 with the mixture 6. In this case, the viscosity of the polythiol is increased by the thixotropic agent, and the contact between the solid basic compound coated with the epoxy resin and the polythiol is further suppressed. Alternatively, the method may be a method of producing a mixture 8 by preparing the mixture 4, and kneading the mixture 4 with the mixture 6. In this case, it is possible to knead a larger amount of thixotropic agents and to further extend the pot life.

(Silane Coupling Agent)

A silane coupling agent may be further added to the adhesive according to the present disclosure.

As the silane coupling agent, a silane coupling agent having an epoxy group, a mercapto group, an isocyanate group, and a fluorene skeleton can be used. However, the silane coupling agent is a low-viscosity liquid, for example, a basic silane coupling agent such as an amine compound plays a role as a catalyst, the reaction is started immediately, and the pot life is shortened. Therefore, the silane coupling agent is not suitable.

In a case where the adhesive of the present disclosure is used in a situation where stronger adhesiveness is required at the interface between the adherend and the adhesive, the silane coupling agent preferably has an epoxy group or a mercapto group. Since the main agent is an epoxy resin and the curing agent is a polythiol, it is considered that the silane coupling agent has good compatibility with the silane coupling agent and that peeling at the interface between the adherend and the adhesive is unlikely to occur.

The mixing order of the silane coupling agent is not particularly limited, but it is preferable that the epoxy group-containing silane coupling agent is mixed with the main epoxy resin and the mercapto group-containing silane coupling agent is mixed with the polythiol at the same timing.

(Other Components)

A diluent or other additives usually used for an epoxy-based adhesive may be optionally added to the resin composition containing the above components. For example, it is possible to add a filler in a timely manner and the like depending on the necessity.

(Inkjet Head)

The epoxy resin composition of the present disclosure can be suitably used as an adhesive for bonding parts of an inkjet head.

Figure 2:
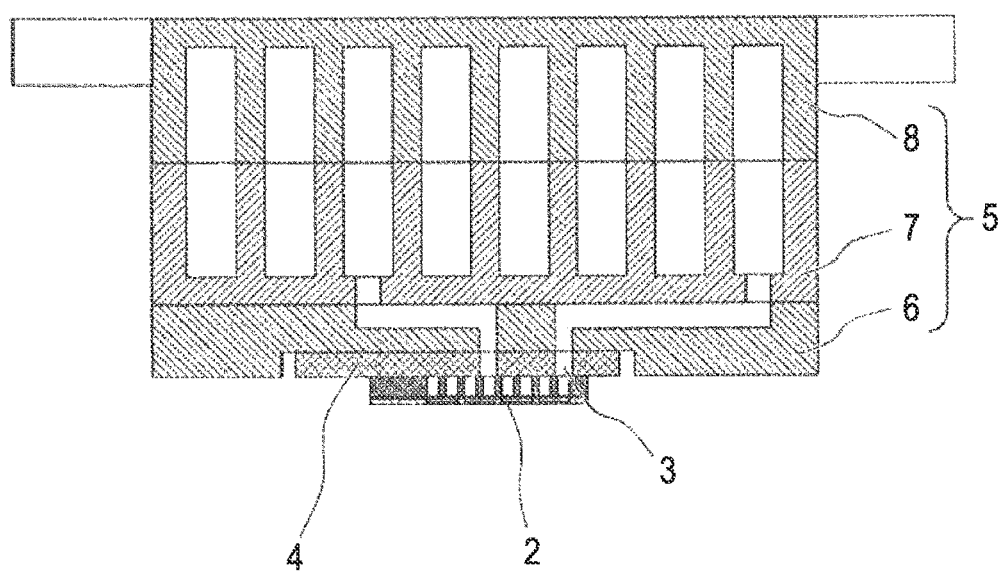
FIG. 2 is a schematic cross-sectional view of an inkjet head.

FIG. 1 is a perspective view illustrating an aspect of an inkjet head, and FIG. 2 is a schematic cross-sectional view of the inkjet head. An inkjet head 1 includes a recording element substrate 2 which ejects an ink, a support member 4 which supports the recording element substrate 2 and has a supply flow path 3 which supplies an ink to the recording element substrate, and a flow path member 5 which supplies an ink to the supply flow path 3.

The flow path member 5 may include a plurality of parts. For example, as illustrated in FIG. 2, the flow path member 5 may include a first flow path member 6, a second flow path member 7, and a third flow path member 8.

In production steps of an inkjet head, it is necessary to accurately bond two members such as each of flow path members, and thus the inkjet head may be assembled by the following procedure. An adhesive is applied to the support member 4, the recording element substrate is temporarily fixed in a short time, and then the main curing is performed. The third flow path member 8 and the second flow path member 7 are bonded together, and the first flow path member 6 is further bonded to the second flow path member 7 to obtain the flow path member 5. Subsequently, the support member 4 and the first flow path member 6 of the flow path member 5 are temporarily fixed. Finally, the main curing is performed.

The epoxy resin composition of the present disclosure has a sufficient pot life after being adjusted as one pack, and is also excellent in temporary fixing property. Therefore, in particular, the epoxy resin composition of the present disclosure can be suitably used as an adhesive on a joint surface between the support member 4 and the first flow path member 6. The epoxy resin composition can be suitably used on at least one joint surface between two members, such as a joint surface between the first flow path member 6 and the second flow path member 7, and a joint surface between the second flow path member 7 and the third flow path member 8. Of course, it can also be suitably used on the joint surface between the support member 4 and the recording element substrate 2.

A resin (engineering plastic) excellent in dimensional accuracy such as ceramics such as alumina, or modified polyphenylene ether resin ("Zylon" (registered trademark), manufactured by Asahi Kasei Corporation and the like) is used in the support member 4 and the flow path member 5. Since the adhesive of the present disclosure is a basic thiol-curing adhesive, functional groups that contribute to adhesion such as hydroxyl groups are relatively not lost by the curing reaction, and can be suitably used as an adhesive for bonding parts of an inkjet head.

EXAMPLES

Subsequently, a method for producing the adhesive of the present disclosure will be described referring to examples.

Examples 1 to 13, Comparative Examples 1 to 9

Table 1 shows composition ratios of Examples, and Table 2 shows composition ratios of Comparative Examples.

In addition, as for the mixing method, the mixing order of each mixture is indicated by arrows.

Mixture 1 (main agent+curing catalyst), mixture 2 (mixture 1+curing agent), mixture 3 (main agent+thixotropic agent), mixture 4 (mixture 3+curing catalyst), mixture 5 (mixture 4+curing agent), mixture 6 (curing agent+thixotropic agent), mixture 7 (mixture 1+mixture 6), mixture 8 (mixture 4+mixture 6).

In Examples 1, 2 and 7, the epoxy resin as the main agent and the solid basic compound as the catalyst were kneaded, and after 12 hours, the polythiol as the curing agent was kneaded (mixture 1→2).

In Examples 3 to 6 and 8 to 12, the epoxy resin as the main agent and the thixotropic agent were kneaded, then the solid basic compound as the catalyst was kneaded, and after 12 hours, the polythiol as the curing agent was kneaded (mixture 3→4→5).

In Example 13, the epoxy resin as the main agent and the solid basic compound as the catalyst were kneaded to obtain a mixture 1, the polythiol as a curing agent and the silica filler as a thixotropic agent were separately kneaded to obtain a mixture 6, and after 12 hours, the mixture 1 and the mixture 6 were kneaded (mixture 1→6→7).

There is a limitation to kneading the thixotropic agent with the epoxy resin as the main agent, considering that the solid basic compound as the catalyst is kneaded thereafter. In Example 14, a mixture 3 was prepared by kneading 10 parts by mass of a silica filler as a thixotropic agent with respect to 100 parts by mass of an epoxy resin as a main agent, and then a mixture 4 was prepared by kneading a solid basic compound as a catalyst. Separately from this, a mixture 6 was prepared by kneading 6.6 parts by mass of a silica filler as a thixotropic agent with respect to 66 parts by mass of polythiol as a curing agent. After 12 hours, the mixture 4 and the mixture 6 were kneaded to obtain a mixture 8 (mixture 3→4→6→8).

On the other hand, in Comparative Examples 1 to 9, all the materials are kneaded at the same time.

Kneading of the epoxy resin as the main agent and the thixotropic agent was carried out in HIVIS MIX model 3 manufactured by Primix Corporation in a vacuum at 60 rpm for 60 minutes, and kneading of the epoxy resin and an agent other than the thixotropic agent was carried out in a vacuum at 60 rpm for 5 minutes.

The time at which the viscosity was doubled at room temperature (25° C.) was measured and set as the pot life of the adhesive. The gel time when heated at 100° C. was measured, and the curability (temporary fixing property) of the adhesive in a short time was evaluated.

The determination was as follows.

AA: Pot life is 8 hours or more and gel time is 3 seconds or less.

A: The pot life is 3 hours or more to less than 8 hours, and the gel time is more than 3 seconds to less than 10 seconds.

C: Pot life is less than 3 hours, or gel time is 10 seconds or more.

In Comparative Examples 1 and 2, a liquid basic compound was used as a catalyst. In Comparative Example 1, since the amount of catalyst is small, the gel time is long. If the addition amount of the catalyst is increased as in Comparative Example 2, the gel time is not shortened for the short pot life. At a time point when the epoxy resin, the liquid basic compound, and the polythiol are kneaded, the liquid basic compound and the polythiol are mixed, and thus it is considered that the pot life and the temporary fixing property cannot be achieved at the same time.

In Comparative Examples 7 to 9, solid basic compounds were used. In Comparative Examples 1 and 9, the time for doubling the viscosity is the same as 14 hours, but the gel time is shorter in Comparative Example 9. When a solid basic compound was used instead of a liquid basic compound, achieving of both the pot life and the temporary fixing property was slightly approached. However, the gel time of Comparative Example 9 is 78 seconds, and this is a long time for the temporary fixing step. Although the adhesive has a sufficient pot life, it cannot be said that the adhesive has temporary fixing property.

In order to improve the temporary fixing property of Comparative Example 9, the amount of the solid basic compound was increased in Comparative Examples 6 to 8. The larger the amount of the solid basic compound, the shorter the gel time and the better the temporary fixing property. On the other hand, the pot life became shorter. In a case where in a resin containing an epoxy resin, a polythiol, and a solid basic compound, all the materials are mixed at the same time, the solid basic compound is preferably less than 3 parts by mass, and further preferably 0.5 parts by mass or less with respect to 100 parts by mass of the epoxy resin in order to obtain a sufficient pot life. If the amount of the solid basic compound is less than 3 parts by mass, the adhesive has a sufficient pot life, but it cannot be said that the adhesive has temporary fixing property.

In Example 1 and Comparative Example 3, and in Example 2 and Comparative Example 6, the production method was changed with the same composition. As can be seen from the comparison between Example 1 and Comparative Example 3, and Example 2 and Comparative Example 6, the gel time does not change, but the pot life is significantly extended in each of the examples of the present disclosure. Since the solid basic compound is covered with the epoxy resin, it is considered that it is possible to suppress the dissolution of the solid basic compound in the polythiol, and the viscosity increase is slow even at room temperature as one pack, and the pot life is extended. On the other hand, since the composition was the same, the gel time did not change. By going through a step of kneading the epoxy resin as the main agent, and the solid basic compound as the catalyst to obtain a mixture, and then kneading the polythiol as a curing agent with the mixture, an adhesive in which both the pot life and temporary fixing property is achieved was obtained.

As for the addition amount of the solid basic compound as a catalyst, as shown in Comparative Examples 6 to 9, if the curing agent has a composition of an ester-type curing agent having a relatively slow reactivity, the amount is 3 parts by mass or more, and the gel time is 10 seconds or less. The larger the addition amount of the solid basic compound, the shorter the gel time. If the amount is more than 10 parts by mass, the viscosity of the adhesive itself increases, and the amount of unreacted catalyst also increases. Therefore, 3 to 10 parts by mass is preferable. However, in Comparative Examples 6 to 9, a step of covering the solid basic compound with the epoxy resin in advance has not been gone through, and thus the pot life is short.

In Examples 3 to 5, the influence of the kind of the solid basic compound as a catalyst was examined. In any of the solid basic compounds, both pot life and temporary fixing property were achieved.

In Examples 5 and 6, the influence of the kind of the polythiol as a curing agent was examined. In any of the polythiols, both the pot life and temporary fixing property were achieved. The temporary fixing time was shorter in the polythiol having an ether skeleton than in the polythiol having an ester skeleton. In a case where temporary fixing property in a shorter time is required, an ether type polythiol having high reactivity is preferable.

The amount of the thixotropic agent is examined in Examples 7 to 14.

The pot life was extended in 1 and 2.5 parts by mass of Examples 8 and 9 with respect to no addition (0 parts by mass) of Example 7. By adding the thixotropic agent to the epoxy resin, the epoxy resin covering the solid basic compound can be made highly viscous and the thixotropy can be improved. As a result, it is considered that it takes time until the dissolution of the solid basic compound in the polythiol is suppressed, and the solid basic compound becomes a basic catalyst to start the polymerization reaction between the epoxy resin and the polythiol. In Examples 10 to 12, there is almost no change in pot life even if the amount exceeds 2.5 parts by mass (up to 5, 10, and 15 parts by mass). It is considered that the effect of suppressing the dissolution of the solid basic compound in the polythiol is saturated.

In Example 13, a thixotropic agent was added to the polyol. The pot life was slightly extended with respect to the no addition of Example 7. It is considered that the addition of the thixotropic agent to the polythiol suppressed the dissolution of the solid basic compound in the polyol.

10 parts by mass of the thixotropic agent was added to the epoxy resin of Example 14, and 6.6 parts by mass of the thixotropic agent was added to the polythiol. By making the total content of the thixotropic agent 16.6 parts by mass with respect to 100 parts by mass of the epoxy resin, the pot life is further extended. It is considered that the dissolution of the solid basic compound in the polythiol was further suppressed by adding the thixotropic agent to both the epoxy resin and the polythiol. It is possible to achieve both the pot life and the temporary fixing property without adding a thixotropic agent, but in a case where a longer pot life is desired, although it depends on the kind of the main agent and the curing agent, it was checked that it is preferable to add a thixotropic agent, and the content thereof is preferably 1 to 20 parts by mass.

TABLE 1

| | | | | Example | | | | | | |
|---|---|---|---|---|---|---|---|---|---|---|
| Item | | Product name | Material name | 1 | 2 | 3 | 4 | 5 | 6 | 7 |
| Main agent (part) | Epoxy resin | jER828 | Bisphenol A type epoxy | 100 | 100 | 100 | 100 | 100 | 100 | 100 |
| | | jER162 | Phenol novolac | | | | | | | |

TABLE 1-continued

| Item | | Product name | Material name | | | | | | | |
|---|---|---|---|---|---|---|---|---|---|---|
| Thixotropic agent (part) | | AEROSIL200 | Fumed silica | | | 10 | 10 | 10 | 10 | |
| Curing agent (part) | Polythiol | PEPT | 3 functional thiol ester type | 66 | | | | | 66 | 66 |
| | | TMMP | 3 functional thiol ester type | | 74 | 74 | 74 | 74 | | |
| Curing catalyst (part) | Solid basic compound | PN-23J | Epoxy amine adduct | | | | | | | |
| | | MY-24 | Epoxy amine adduct | | | | 10 | | | |
| | | MY-25 | Epoxy amine adduct | | | | | 10 | | |
| | | PN40J | Epoxy amine adduct | 10 | 10 | | | | 10 | 5 |
| | Liquid basic compound | 1B2PZ | Imidazole | | | | | | | |
| | | Mixing Method | | Mixture 1→2 | Mixture 1→2 | Mixture 3→4→5 | Mixture 3→4→5 | Mixture 3→4→5 | Mixture 3→4→5 | Mixture 1→2 |
| Evaluation | | Pot life | (Time) | 3 | 5 | 14 | 14 | 14 | 8 | 3 |
| | | Gel time | (Second) | 3 | 4 | 4 | 4 | 4 | 3 | 3 |
| Determination | | | Adhesive in which both of pot life and temporary fixing property are achieved | A | A | A | A | A | AA | A |

| | | | | Example | | | | | | |
|---|---|---|---|---|---|---|---|---|---|---|
| Item | | Product name | Material name | 8 | 9 | 10 | 11 | 12 | 13 | 14 |
| Main agent (part) | Epoxy resin | jER828 | Bisphenol A type epoxy | 100 | 100 | 100 | 100 | 100 | 100 | 100 |
| | | jER162 | Phenol novolac | | | | | | | |
| Thixotropic agent (part) | | AEROSIL200 | Fumed silica | 1 | 2.5 | 5 | 10 | 15 | 6.6 | 16.6 |
| Curing agent (part) | Polythiol | PEPT | 3 functional thiol ester type | 66 | 66 | 66 | 66 | 66 | 66 | 66 |
| | | TMMP | 3 functional thiol ester type | | | | | | | |
| Curing catalyst (part) | Solid basic compound | PN-23J | Epoxy amine adduct | | | | | | | |
| | | MY-24 | Epoxy amine adduct | | | | | | | |
| | | MY-25 | Epoxy amine adduct | | | | | | | |
| | | PN40J | Epoxy amine adduct | 5 | 5 | 5 | 5 | 5 | 5 | 5 |
| | Liquid basic compound | 1B2PZ | Imidazole | | | | | | | |
| | | Mixing Method | | Mixture 3→4→5 | Mixture 3→4→5 | Mixture 3→4→5 | Mixture 3→4→5 | Mixture 3→4→5 | Mixture 1→6→7 | Mixture 3→4→6→8 |
| Evaluation | | Pot life | (Time) | 5 | 8 | 8 | 8 | 8 | 4 | 10 |
| | | Gel time | (Second) | 3 | 3 | 3 | 3 | 3 | 3 | 3 |
| Determination | | | Adhesive in which both of pot life and temporary fixing property are achieved | A | AA | AA | AA | AA | A | AA |

TABLE 2

| | | | | Comparative example | | | | | | | | |
|---|---|---|---|---|---|---|---|---|---|---|---|---|
| Item | | Product name | Material name | 1 | 2 | 3 | 4 | 5 | 6 | 7 | 8 | 9 |
| Main agent (part) | Epoxy resin | jER828 | Bisphenol A type epoxy | 100 | 100 | 100 | 100 | 100 | 100 | 100 | 100 | 100 |
| | | jER162 | Phenol novolac | | | | | | | | | |
| Thixotropic agent (part) | | AEROSIL200 | Fumed silica | | | | | | | | | |
| Curing agent (part) | Polythiol | PEPT | 3 functional thiol ester type | | | | 66 | 66 | 66 | | | |
| | | TMMP | 3 functional thiol ester type | 74 | 74 | | | | | 74 | 74 | 74 |
| Curing catalyst (part) | Solid basic compound | PN-23J | Epoxy amine adduct | | | | | | | | | |
| | | MY-24 | Epoxy amine adduct | | | | | | | | | |

TABLE 2-continued

| Item | Product name | Material name | Comparative example | | | | | | | | |
|---|---|---|---|---|---|---|---|---|---|---|---|
| | | | 1 | 2 | 3 | 4 | 5 | 6 | 7 | 8 | 9 |
| | MY-25 | Epoxy amine adduct | | | | | | | | | |
| | PN40J | Epoxy amine adduct | | | 10 | 5 | 3 | 10 | 5 | 3 | 0.5 |
| Liquid basic compound | 1B2PZ | Imidazole | 1 | 5 | | | | | | | |
| | Mixing Method | | All components are mixed at the same time | | | | | | | | |
| Evaluation | Pot life | (Time) | 14 | 0.5 | 0.5 | 0.5 | 2 | 2 | 2 | 2 | 14 |
| | Gel time | (Second) | 260 | 40 | 3 | 3 | 7 | 4 | 5 | 9 | 78 |
| Determination | Adhesive in which both pot life and temporary fixing property are achieved | | C | C | C | C | C | C | C | C | C |

The abbreviations in the tables are as follows. The same applies to the table below.
  jER828: Product name, bisphenol A type epoxy resin (epoxy equivalents: 184 to 194), manufactured by Mitsubishi Chemical Corporation
  jER162: Product name, manufactured by Mitsubishi Chemical Corporation
  AEROSIL200: Product name "AEROSIL200", manufactured by Nippon Aerosil Corporation
  PEPT: Pentaerythritol tripropanethiol (thiol equivalents: about 115), manufactured by SC Organic Chemical Co., Ltd.
  TMMP: Trimethylolpropane tris(3-mercaptopropionate) (thiol equivalents: about 133), manufactured by SC Organic Chemical Co., Ltd.
  PN23J: Product name "Amicure PN-23J", manufactured by Ajinomoto Fine Techno Co., Ltd.
  MY-24: Product name "Amicure MY-24", manufactured by Ajinomoto Fine Techno Co., Ltd.
  MY-25: Product name "Amicure MY-25", manufactured by Ajinomoto Fine Techno Co., Ltd.
  PN40J: Product name "Amicure PN-40J", manufactured by Ajinomoto Fine Techno Co., Ltd.
  1B2PZ: Product name "Curesol 1B2PZ", manufactured by Shikoku Chemicals Corporation Examples 15 to 27

Tables 3 and 4 show the composition ratios of Examples 15 to 27. The composition ratios of Examples 5 and 6 are also shown.

In Examples 15 and 17 to 19, similarly to Example 14, after preparing the mixture 3, a silane coupling agent is added to the mixture 3 and kneaded, and then a solid basic compound as a catalyst is added and kneaded to prepare a mixture 4. In addition, a mixture 6 was prepared by kneading the residue of the thixotropic agent with a polythiol as a curing agent. After 12 hours, the mixture 6 was kneaded with the mixture 4 to obtain a mixture 8.

Since Example 16 uses a mercapto group-containing silane coupling agent, the mixture 8 was obtained in the same manner as in Example 14 except that the silane coupling agent was added to the mixture 6. In addition, in Examples 20, 21, and 23 to 27, similarly to Example 11, after preparing the mixture 3, a silane coupling agent was added to the mixture 3 and kneaded, and then the solid basic compound as a catalyst was added and kneaded to prepare a mixture 4. After 12 hours, the mixture 4 was kneaded with a polythiol as a curing agent to obtain a mixture 5. In Example 22, a mercapto-based silane coupling agent was kneaded together with a polythiol as a curing agent at the stage of making the mixture 5.

The kneading of the epoxy resin as the main agent and the thixotropic agent was carried out in a HIVIS MIX model 3 manufactured by Primix Corporation in a vacuum at 60 rpm for 60 minutes, and the kneading of the epoxy resin and the agent other than the thixotropic agent was carried out in a vacuum at 60 rpm for 5 minutes.

The adhesive was evaluated by the following method.

Evaluation was performed in the same manner as above to determine whether or not the adhesive is an adhesive in which both the pot life and the gel time were achieved.

In addition, 2 g of a cured product heated to 160° C. for 2 hours was immersed in 20 g of ink (ink for service head, manufactured by Canon), and heated to 121° C. for 10 hours. A mass of the cured product after immersion was measured, and the mass change rate was calculated by comparison with the mass before immersion.

Figure 3:
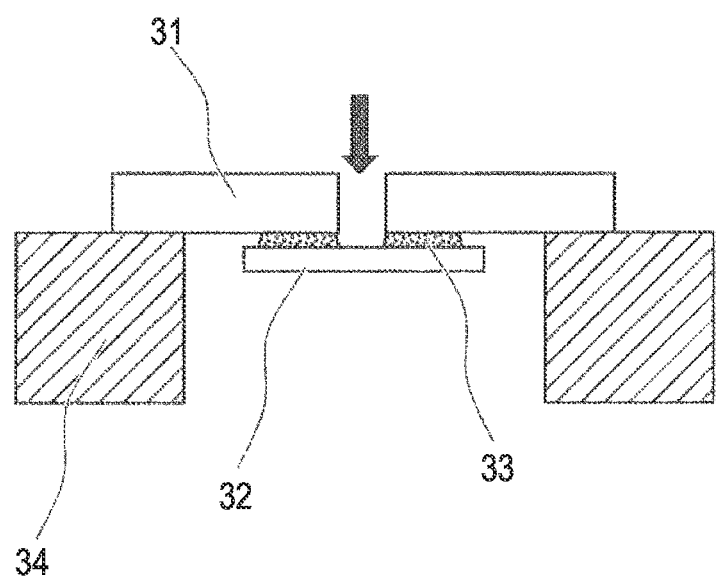
FIG. 3 is a schematic view illustrating an aspect at a time of measuring the adhesive strength by an abutting method.

In addition, the parts (alumina and alumina) constituting the inkjet head were bonded together with an adhesive and heated to 160° C. for 2 hours. Here, as illustrated in FIG. 3, alumina plates 21 and 22 bonded with an adhesive 23 were placed on a pedestal 24, and the adhesive strength was measured by an abutting method in which the adhesive was pushed through hole portions made in the alumina plate 21 with a measuring jig. At the time, a state of peeling was also observed. In the case of part breakage, the peel strength cannot be measured accurately. Therefore, the peel strength was indicated as ND. In addition, the parts were bonded with an adhesive and heated to 160° C. for 2 hours, then immersed in the ink, and heated to 121° C. for 60 hours. After washing with water and drying, the adhesive strength was measured by the abutting method, and the state of peeling was observed.

Determination of an adhesive suitable for an inkjet head is
  AA: Not peeled off at an adhesive strength of 1.0 kgf/mm$^2$ (9.8 N/mm$^2$), and is pressed further to terminate with part breakage
  A: The adhesive strength was 1.0 kgf/mm$^2$ (9.8 N/mm$^2$) or more, and the interface was peeled off.

As described above, in Example 5, a polythiol having an ester skeleton (TMMP) was used, and in Example 6, a polythiol having an ether skeleton (PETE) was used. Since PETE and TMMP have different molecular weights with respect to thiol groups, each polythiol was kneaded in different parts by mass. The mass change rate was small and the adhesive strength after ink contact was strong when PETE of the ether skeleton was used, compared to TMMP of the ester skeleton. It is considered that the ether skeleton has higher chemical resistance, higher reactivity, and higher crosslinking density than the ester skeleton. A polythiol having an ether skeleton is preferable as an adhesive for bonding parts of an inkjet head, as compared with a polythiol having an ester skeleton.

In Examples 15 to 22, the influence of the kind of the silane coupling agent was examined. All of the silane coupling agents had both the pot life and the temporary fixing property, and had sufficient adhesive strength. Among these, when an epoxy group or a mercapto group was used as the silane coupling agent, the adhesive strength was measured after the ink contact, and the interface was not peeled off and the parts were broken. In a case where the parts of an inkjet head were bonded, an adhesive that breaks parts is more preferable than an adhesive that peels off the interface in order not for different colors to mix with each other. As an adhesive for bonding the parts of the inkjet head, an adhesive to which an epoxy group- or a mercapto group-containing silane coupling agent is added is more preferable. Since the adhesive contains an epoxy resin as a main agent and a polythiol as a curing agent, it is considered that the epoxy group- or mercapto group-containing silane coupling agent has good compatibility with the main agent and the curing agent and does not peel off the interface.

In Examples 20 and 23 to 25, the addition amount of the polythiol was examined. With any amount of the polythiol, both the pot life and the temporary fixing property were achieved. The lower the amount of the polythiol, the longer the gel time. In order to maintain the temporary fixing property, the polythiol is preferably 0.5 or more thiol equivalents with respect to 1 epoxy equivalent of the epoxy resin. As the amount of the polythiol increased, the mass change rate increased. It is considered that the amount of a polythiol unreactable with the epoxy resin increased, the unreactable polythiol was eluted into the ink, the ink penetrated into a space where the polythiol had escaped, and the mass change became large. In order not to increase the amount of the unreactable polythiol, the polythiol is preferably 1 or less thiol equivalent with respect to 1 epoxy equivalent of the epoxy resin.

In Examples 20, 26, and 27, the mixing ratios of the two kinds of epoxy resins were varied. In all ratios, both the pot life and the temporary fixing property were achieved. In addition, the adhesive was also suitable as an adhesive for bonding parts of an inkjet head.

TABLE 3

| Item | | Product name | Material name | Example 5 | 6 | 15 | 16 | 17 | 18 | 19 |
|---|---|---|---|---|---|---|---|---|---|---|
| Main agent (part) | Epoxy resin | jER828 | Bisphenol A type epoxy | 100 | 100 | 100 | 100 | 100 | 100 | 100 |
| | | jER162 | Phenol novolac | | | | | | | |
| Thixotropic agent (part) | | AEROSIL200 | Fumed silica | 10 | 10 | 16.6 | 16.6 | 16.6 | 16.6 | 16.6 |
| Curing agent (part) | Polythiol | PEPT | 3 functional thiol ether type | | 66 | 66 | 52 | 39 | 33 | 66 |
| | | TMMP | 3 functional thiol ester type | 74 | | | | | | |
| Curing catalyst (part) | Solid basic compound | PN40J | Epoxy amine adduct | 10 | 10 | 5 | 5 | 5 | 5 | 5 |
| Mixing method | | | | Mixture 3→4→5 | Mixture 3→4→5 | Mixture 3→4→6→8 | Mixture 3→4→6→8 | Mixture 3→4→6→8 | Mixture 3→4→6→8 | Mixture 3→4→6→8 |
| Silane coupling agent (part) | | A-187 | Epoxy-based | | | 8.5 | | | | |
| | | KBM-803 | Mercapto-based | | | | 8.5 | | | |
| | | KBE-9007 | Isocyanate-based | | | | | 8.5 | | |
| | | OCG-157-3 | Fluorene skeleton-based | | | | | | 8.5 | |
| | | A-186 | Alicyclic epoxy-based | | | | | | | |
| | | X-12-1156 | Multifunctional mercapto-based | | | | | | | |
| | | X-12-1159L | Multifunctional isocyanate-based | | | | | | | 8.5 |
| Silane coupling agent addition method | | | | — | — | Mixture 3 | Mixture 6 | Mixture 3 | Mixture 3 | Mixture 3 |
| Evaluation | Pot life | | (Time) | 14 | 8 | 10 | 10 | 10 | 10 | 10 |
| | Gel time | | (Second) | 4 | 3 | 3 | 3 | 3 | 3 | 3 |
| | Mass change rate | | (%) | 11 | 9.8 | 9 | 9.8 | 9.9 | 7.6 | 8.2 |
| | Adhesive force before ink contact | | (Kgf/mm$^2$) | 1.6 | ND | ND | ND | ND | ND | ND |
| | | | Mode | Surfactant | Part breakage | Part breakage | Part breakage | Part breakage | Part breakage | Part breakage |
| | Adhesive force after ink contact | | (Kgf/mm$^2$) | 1 | 1.7 | ND | ND | 1.6 | 1.1 | 1.1 |
| | | | Mode | Surfactant | Surfactant | Part breakage | Part breakage | Surfactant | Surfactant | Surfactant |
| Determination | Adhesive in which both pot life and temporary fixing property are achieved | | | A | AA | AA | AA | AA | AA | AA |
| | Adhesive suitable for inkjet head | | | A | A | AA | AA | A | A | A |

TABLE 4

| Item | | Product name | Material name | Example 20 | 21 | 22 | 23 | 24 | 25 | 26 | 27 |
|---|---|---|---|---|---|---|---|---|---|---|---|
| Main agent (part) | Epoxy resin | jER828 | Bisphenol A type epoxy | 100 | 100 | 100 | 100 | 100 | 100 | 100 | 100 |
| | | jER162 | Phenol novolac | | | | | | | 28 | 10 |
| Thixotropic agent (part) | | AEROSIL200 | Fumed silica | 10 | 10 | 10 | 10 | 10 | 10 | 10 | 10 |
| Curing agent (part) | Polythiol | PEPT | 3 functional thiol ether type | 66 | 66 | 66 | 52 | 39 | 33 | 66 | 66 |
| | | TMMP | 3 functional thiol ester type | | | | | | | | |
| Curing catalyst (part) | Solid basic compound | PN40J | Epoxy amine adduct | 5 | 5 | 5 | 5 | 5 | 5 | 5 | 5 |
| | Mixing method | | | Mixture 3→4→5 | Mixture 3→4→5 | Mixture 3→4→5 | Mixture 3→4→5 | Mixture 3→4→5 | Mixture 3→4→5 | Mixture 3→4→5 | Mixture 3→4→5 |
| Silane coupling agent (part) | | A-187 | Epoxy-based | 8.5 | | | 8.5 | 8.5 | 8.5 | 8.5 | 8.5 |
| | | KBM-803 | Mercapto-based | | | | | | | | |
| | | KBE-9007 | Isocyanate-based | | | | | | | | |
| | | OCG-157-3 | Fluorene skeleton-based | | | | | | | | |
| | | A-186 | Alicyclic epoxy-based | | 8.5 | | | | | | |
| | | X-12-1156 | Multifunctional mercapto-based | | | 8.5 | | | | | |
| | | X-12-1159L | Multifunctional isocyanate-based | | | | | | | | |
| | Silane coupling agent addition method | | | Mixture 3 | Mixture 3 | Mixture 5 | Mixture 3 | Mixture 3 | Mixture 3 | Mixture 3 | Mixture 3 |
| Evaluation | Pot life | | (Time) | 10 | 10 | 8 | 14 | 16 | 18 | 3 | 4 |
| | Gel time | | (Second) | 3 | 3 | 4 | 5 | 7 | 3 | 3 | 3 |
| | Mass change rate | | (%) | 9.9 | 9.3 | 13.3 | 8 | 6.5 | 6.1 | 10.4 | 11.6 |
| | Adhesive force before ink contact | | (Kgf/mm²) Mode | ND Part breakage | ND Part breakage | ND Part breakage | ND Part breakage | ND Part breakage | ND Part breakage | ND Part breakage | ND Part breakage |
| | Adhesive force after ink contact | | (Kgf/mm²) Mode | ND Part breakage | ND Part breakage | ND Part breakage | ND Part breakage | ND Part breakage | ND Part breakage | ND Part breakage | ND Part breakage |
| Determination | Adhesive in which both pot life and temporary fixing property are achieved | | | AA | AA | AA | AA | AA | AA | AA | AA |
| | Adhesive suitable for inkjet head | | | AA | AA | AA | AA | AA | AA | AA | AA |

The silane coupling agents in the table are as follows.
A-186: Product name "Silquest A-186", manufactured by Momentive Performance Materials Japan
A-187: Product name "Silquest A-187", manufactured by Momentive Performance Materials Japan
KBM-803: Product name, 3-mercaptopropyltrimethoxysilane, manufactured by Shin-Etsu Chemical Co., Ltd.
KBE-9007: Product name, 3-isocyanate propyltriethoxysilane, manufactured by Shin-Etsu Chemical Co., Ltd.
X-12-1156: Product name, polyfunctional mercapto-based silane coupling agent, manufactured by Shin-Etsu Chemical Co., Ltd.
X-12-1159L: Product name, polyfunctional isocyanate-based silane coupling agent, manufactured by Shin-Etsu Chemical Co., Ltd.
OCG-157-3: Fluorene-based silane coupling agent, manufactured by Osaka Gas Chemical Co., Ltd.

Example 28

Generally, in a case where the blending component of the adhesive is a mixture of a liquid and a solid, if the adhesive is used in a narrow space of several tens of μm between an adherend and an adherend, the movement of the solid component is restricted by a narrow gap, separation of the blending occurs, bleeding occurs during the curing reaction, and curing failure occurs. In the present disclosure, the curing catalyst is a solid and there is a concern about bleeding. Therefore, the presence or absence of bleeding was checked by the following procedure. Regarding the examples of the present disclosure, bonding was performed via spacers of a predetermined size. The presence or absence of bleeding and the presence or absence of curing were checked by varying the thickness to 5, 10, 20, and 30 μm without spacers.

No bleeding was observed in all cases, and no uncured components could be checked. This is because the solid component is a catalyst and the reaction proceeds in a small amount. In the method of the present disclosure, it is assumed that a large amount of catalyst is contained, or the curing agent is a polythiol, and thus the reactivity is extremely high.

Due to the reactivity, by being subjected to a first heat curing which is temporary fixing and a second heat curing which is a main curing that takes longer than the first heat curing in two stages, the adhesive of the present disclosure becomes particularly suitable for precision bonding.

For example, there is a case where an ink supply system or the like is joined with alumina to a recording element provided with an ink flow path and an ejection orifice on a Si substrate on which an ink ejection pressure generating element and wiring for applying an electric pulse are formed. In such a case, in order to bond the flow paths to each other with high accuracy, it is necessary to maintain the state and cure the flow paths after alignment. It takes at least one hour to cure the adhesive until the ink resistance can be exhibited, and it is extremely difficult to align the adhesive with a jig or the like and hold it in a heat-curing furnace. Therefore, if the adhesive of the present disclosure is used, a heat tool can be directly applied to the Si substrate of the recording element and heated, and if the temperature is 100° C., curing can be performed and temporary fixing can be performed in several seconds.

After the temporary fixing, since the adhesive is cured, it does not shift even if the jig is removed, so that the main curing can be performed in a heat-curing furnace. The second heat curing, which is the main curing, naturally takes a longer time than the first heat curing which is temporary fixing since the adhesive is sufficiently cured. The second heat curing is preferably at a higher temperature than the first heat curing. The curing time and the curing temperature may be appropriately optionally selected depending on the kinds and the composition ratios of a main agent, a curing agent, and a solid basic compound to be combined, and other additives. In addition, in particular, according to the system to which a thixotropic agent is added, the flow of the adhesive into a fine flow path of the inkjet head can be controlled, and if an ether type polythiol is used, high ink resistance can be expected, and adhesive reliability is also ensured.

As shown in Table 5, an adhesive was prepared in the same manner as in Example 21 except that PN40J of the solid basic compound was changed from 5 parts by mass to 3 parts by mass. Using this adhesive, two modified polyphenylene ether resin plates (product name "Zylon (registered trademark) L564Z", manufactured by Asahi Kasei Corporation, abbreviation: m-PPE) were bonded together as parts of an inkjet head. Curing was performed at 150° C. for 2 hours.

When the parts were peeled off by the abutting method, the adhesive was cohesively failed. The adhesive of the present disclosure had sufficient adhesiveness to the m-PPE resin plate.

Examples 30 to 35, similarly to Example 14, after preparing a mixture 3 by kneading 10 parts by mass of a silica filler as a thixotropic agent and an organic thixotropic agent with respect to 100 parts by mass of an epoxy resin as a main agent, a mixture 4 was prepared by kneading a solid basic compound as a catalyst. Separately from this, a mixture 6 was prepared by kneading 6.6 parts by mass of a silica filler as a thixotropic agent with respect to 66 parts by mass of polythiol as a curing agent. After 12 hours, the mixture 4 and the mixture 6 were kneaded to obtain a mixture 8 (mixing of organic thixotropic agent is mixture 3).

In Example 36, after preparing a mixture 3 by kneading 10 parts by mass of a silica filler as a thixotropic agent with respect to 100 parts by mass of an epoxy resin as a main agent, a mixture 4 was prepared by kneading a solid basic compound as a catalyst. Separately from this, after preparing a mixture 6 by kneading 6.6 parts by mass of silica filler as a thixotropic agent and an organic thixotropic agent with respect to 66 parts by mass of polythiol as a curing agent. After 12 hours, the mixture 4 and the mixture 6 were kneaded to obtain a mixture 8 (Mixing of organic thixotropic agent is mixture 6).

In Example 37, after preparing a mixture 3 by kneading 10 parts by mass of a silica filler as a thixotropic agent and 1.5 parts by mass of an organic thixotropic agent with respect to 100 parts by mass of an epoxy resin as a main agent, a mixture 4 was prepared by kneading a solid basic compound as a catalyst. Separately from this, a mixture 6 was prepared by kneading 66 parts by mass of the silica filler as a thixotropic agent and 1.5 parts by mass of the organic thixotropic agent with respect to 6.6 parts by mass of the polythiol as a curing agent. After 12 hours, the mixture 4 and the mixture 6 were kneaded to obtain a mixture 8 (Mixing of organic thixotropic agent is mixtures 3, 6).

The kneading of the epoxy resin as a main agent and the thixotropic agent was carried out in a HIVIS MIX model 3 manufactured by Primix Corporation in a vacuum at 60 rpm for 60 minutes, and the kneading of the epoxy resin and an agent other than the thixotropic agent was carried out in a vacuum at 60 rpm for 5 minutes.

TABLE 5

| Item | | Product name | Material name | Example 28 |
| --- | --- | --- | --- | --- |
| Main agent (part) | Epoxy resin | jER828 | Bisphenol A type epoxy | 100 |
| Thixotropic agent (part) | | AEROSIL200 | Fumed silica | 10 |
| Curing agent (part) | Polythiol | PEPT | 3 functional thiol ether type | 66 |
| Curing catalyst (part) | Solid basic compound | PN40J | Epoxy amine adduct | 3 |
| Silane coupling agent (part) | Epoxy compound | A-186 | Alicyclic epoxy | 8.5 |

Examples 29 to 37

In Examples 29 to 37, the thick application property was examined. In a case where the adherend has irregularities or waviness, if the adhesive thickness is thin, the adhesive does not get wet sufficiently and may be peeled off during use, and thus it is necessary to apply the adhesive thickly. Therefore, it was examined whether the adhesive could be applied thickly.

Table 6 shows the composition ratios of Examples 29 to 37. The composition ratio of Example 16 is also shown. Example 29 was prepared in the same manner as in Example 16 except for the addition of molten silica as a filler. In The thick application of the adhesive was evaluated by the following method.

Thixotropy was measured with a viscometer. Specifically, measurement was performed with a viscometer at a rotary rate of 10 rpm and 50 rpm, and (viscosity at 10 rpm)/(viscosity at 50 rpm) was used as the value of thixotropy. If the value of thixotropy is large, the shape retention property is high and the adhesive can be applied thickly. Further, the thixotropy was measured every 2 hours at room temperature, and the one of which thixotropy was 3 or more even after 8 hours was designated as AA. The one of which thixotropy was less than 3 was designated as A. If the thixotropy is less than 3, it is difficult to apply the adhesive thickly, and applications for thin application is limited. Furthermore, in order to check the possibility of thick application, it was checked whether 0.7 mm-thick application was possible or not. The adhesive was applied with a needle 18G (inner diameter 0.84 mm), and the application height of 0.7 mm or more was designated as AA, and the application of less than 0.7 mm was designated as A.

In Example 16, the thixotropy was about 1, and thick application of 0.7 mm or more was not possible. Similarly, in Example 29, silica was highly filled as a filler in the composition of Example 16 to obtain a high viscosity, but the thixotropy was about 1, and the thick application property was also the same as that of Example 16. On the other hand, in Examples 30 to 37, in addition to an inorganic thixotropic agent, an organic thixotropic agent was also used. By using both of these, the thixotropy was 3 or more, and thick application of 0.7 mm or more was possible. It is presumed that this is because the silica surface of the inorganic thixotropic agent has countless hydroxyl groups, and the interaction with the functional groups of the organic thixotropic agent resulted in high thixotropy.

accorded the broadest interpretation so as to encompass all such modifications and equivalent structures and functions.

This application claims the benefit of Japanese Patent Application No. 2020-005947, filed Jan. 17, 2020, and Japanese Patent Application No. 2020-182573, filed Oct. 30, 2020 which are hereby incorporated by reference herein in their entirety.

What is claimed is:

1. A method for producing an epoxy resin composition containing an epoxy resin, a solid amine-based latent curing agent, and a polythiol, the method comprising:
    producing a mixture 1 by kneading the epoxy resin with the solid amine-based latent curing agent; and
    producing a mixture 2 by kneading the polythiol with the mixture 1,
    wherein the epoxy resin is selected from the group consisting of a bisphenol A-type epoxy resin and an epoxy novolac resin, and
    wherein the polythiol is pentaerythritol trispropanethiol.

TABLE 6

| Item | | Product name | Material name | 16 | 29 | 30 | 31 | 32 | 33 | 34 | 35 | 36 | 37 |
|---|---|---|---|---|---|---|---|---|---|---|---|---|---|
| Main agent (part) | Epoxy resin | jER828 | Bisphenol A type epoxy | 100 | 100 | 100 | 100 | 100 | 100 | 100 | 100 | 100 | 100 |
| Thixotropic agent (part) | Inorganic | AEROSIL200 | Fumed silica | 16.6 | 16.6 | 16.6 | 16.6 | 16.6 | 16.6 | 16.6 | 16.6 | 16.6 | 16.6 |
| | Organic | RHEOCIN | Alkyl | | 3 | | | | | | | | |
| | Organic | RHEOBYK-430 | Urethane-modified polyamide | | | | 3 | | | | | | |
| | Organic | RHEOBYK-431 | Urethane-modified polyamide | | | | | | 3 | | | | |
| | Organic | RHEOBYK-R606 | Carboxylic acid ester | | | | | | | 3 | | 3 | 3 |
| | Organic | DISPARON 3600N | Polyether ester | | | | | | | | 3 | | |
| | Organic | DISPARON 3600EF | Polyamide | | | | | | | | | 3 | |
| Curing agent (part) | Polythiol | PEPT | 3 functional thiol ester type | 66 | 66 | 66 | 66 | 66 | 66 | 66 | 66 | 66 | 66 |
| Curing catalyst (part) | Basic compound | PN40J | Epoxy amine adduct | 5 | 5 | 5 | 5 | 5 | 5 | 5 | 5 | 5 | 5 |
| Filler | Inorganic | FB-5D | Molten silica | | 200 | 200 | 200 | 200 | 200 | 200 | 200 | 200 | 200 |
| Mixing method | | | | | | | | Mixture 3→4→6→8 | | | | | |
| Organic thixotropic agent mixing method | | | | Mixture 3 | Mixture 3 | Mixture 3 | Mixture 3 | Mixture 3 | Mixture 3 | Mixture 3 | Mixture 3 | Mixture 6 | Mixture 3, 6 |
| Evaluation | | Thixotropy | | A | A | AA | AA | AA | AA | AA | AA | AA | AA |
| | | Thick application property | | A | A | AA | AA | AA | AA | AA | AA | AA | AA |

The thixotropic agent and the filler in the table are as follows.

RHEOCIN, RHEOBYK-430, RHEOBYK-431, RHEOBYK-R606: Product name manufactured by BYK Corporation Disparon 3600N, 3900EF: Product name manufactured by Kusumoto Chemicals, Ltd.

FB-5D: Product name manufactured by Denka

While the present disclosure has been described with reference to exemplary embodiments, it is to be understood that the invention is not limited to the disclosed exemplary embodiments. The scope of the following claims is to be 2. A method for producing an epoxy resin composition containing an epoxy resin, a thixotropic agent, a solid basic compound, and a polythiol, the method comprising:
    producing a mixture 3 by kneading the epoxy resin with the thixotropic agent;
    producing a mixture 4 by kneading the solid basic compound with the mixture 3; and
    producing a mixture 5 by kneading the polythiol with the mixture 4, wherein the epoxy resin is selected from the group consisting of a bisphenol A-type epoxy resin and an epoxy novolac resin, and
    wherein the polythiol is pentaerythritol trispropanethiol.

3. A method for producing an epoxy resin composition containing an epoxy resin, a thixotropic agent, a solid basic compound, and a polythiol, the method comprising:
producing a mixture by kneading the epoxy resin with the solid basic compound;
producing a mixture 6 by kneading the polythiol with the thixotropic agent; and
producing a mixture 7 by kneading the mixture 1 with the mixture 6, wherein the epoxy resin is selected from the group consisting of a bisphenol A-type epoxy resin and an epoxy novolac resin, and
wherein the polythiol is pentaerythritol trispropanethiol.

4. The method for producing an epoxy resin composition according to claim 3, wherein the epoxy resin composition is mixed such that a content of the thixotropic agent is 1 to 20 parts by mass with respect to 100 parts by mass of the epoxy resin.

5. The method according to claim 1, wherein the polythiol has 0.5 to 1 thiol equivalents with respect to 1 epoxy equivalent of the epoxy resin.

6. The method according to claim 1, the method further comprising:
adding a silane coupling agent.

7. The method according to claim 6, wherein the silane coupling agent is a silane coupling agent having an epoxy group and/or a mercapto group.

8. The method according to claim 1, wherein the solid amine-based latent curing agent is mixed such that a content of the solid amine-based latent curing agent is 3 to 10 parts by mass with respect to 100 parts by mass of the epoxy resin.

9. The method according to claim 1, further comprising kneading the epoxy resin with a thixotropic agent prior to the producing the mixture 1.

10. The method according to claim 9, wherein the thixotropic agent is an inorganic thixotropic agent.

11. The method according to claim 9, wherein the thixotropic agent is an inorganic silica.

12. The method according to claim 9, wherein the thixotropic agent is an organic thixotropic agent.

13. The method according to claim 1, further comprising kneading the polythiol with a thixotropic agent prior to the producing the mixture 2.

14. The method according to claim 13, wherein the thixotropic agent is an inorganic thixotropic agent.

15. The method according to claim 13, wherein the thixotropic agent is an inorganic silica.

16. The method according to claim 13, wherein the thixotropic agent is an organic thixotropic agent.

17. The method for producing an epoxy resin composition according to claim 1, wherein the solid amine-based latent curing agent is an amine adduct-based latent curing agent.

* * * * *